(12) United States Patent
Shirali et al.

(10) Patent No.: US 10,952,565 B2
(45) Date of Patent: Mar. 23, 2021

(54) FRYER APPARATUS AND METHOD FOR IMPROVED HEATING CONTROL OF A COOKING CHAMBER OF THE FRYER APPARATUS

(71) Applicant: Henny Penny Corporation, Eaton, OH (US)

(72) Inventors: Manouchehr Shirali, Richmond, IN (US); Tim A. Landwehr, West Alexandria, OH (US)

(73) Assignee: Henny Penny Corporation, Eaton, OH (US)

( * ) Notice: Subject to any disclaimer, the term of this patent is extended or adjusted under 35 U.S.C. 154(b) by 330 days.

(21) Appl. No.: 16/097,355

(22) PCT Filed: May 2, 2016

(86) PCT No.: PCT/US2016/030415
§ 371 (c)(1),
(2) Date: Oct. 29, 2018

(87) PCT Pub. No.: WO2017/192118
PCT Pub. Date: Nov. 9, 2017

(65) Prior Publication Data
US 2019/0142220 A1 May 16, 2019

(51) Int. Cl.
*A47J 27/00* (2006.01)
*A47J 37/12* (2006.01)
*A23L 5/10* (2016.01)

(52) U.S. Cl.
CPC ............ *A47J 37/1266* (2013.01); *A23L 5/11* (2016.08); *A47J 27/00* (2013.01); *A47J 37/128* (2013.01);
(Continued)

(58) Field of Classification Search
CPC .... A47J 37/1266; A47J 27/00; A47J 37/1247; A47J 37/1252; A47J 37/1276;
(Continued)

(56) References Cited

U.S. PATENT DOCUMENTS 2,176,869 A * 10/1939 Childs ................. A47J 37/1247
126/391.1
4,397,299 A 8/1983 Taylor et al.
(Continued)

FOREIGN PATENT DOCUMENTS

CN 101217905 A 7/2008
EP 0125750 A2 11/1984
(Continued)

OTHER PUBLICATIONS

Japanese Patent Office, Office Action issued in Application No. 2018-557412 dated Feb. 17, 2020 and English translation (8 pages).
(Continued)

*Primary Examiner* — Alfred Basichas
(74) *Attorney, Agent, or Firm* — Wood Herron & Evans LLP

(57) ABSTRACT

A fryer apparatus and method of frying food products includes a cooking chamber, a heater disposed external to the cooking chamber, a fuel system disposed external to the cooking chamber, a blower configured to propel an airflow toward a heater, and a fuel injector configured to inject fuel into the airflow to create an air-fuel mixture. The fuel system is configured to deliver an air-fuel mixture to the heater. The heater is configured to ignite the air-fuel mixture to provide an external heating source for the cooking medium within cooking chamber. The temperature of the cooking medium is controlled by varying the speed of the airflow.

10 Claims, 17 Drawing Sheets

(52) U.S. Cl.
CPC ....... *A47J 37/1247* (2013.01); *A47J 37/1252* (2013.01); *A47J 37/1276* (2013.01); *A47J 37/1285* (2013.01); *A23V 2002/00* (2013.01)

(58) Field of Classification Search
CPC .. A47J 37/128; A47J 37/1285; A47J 37/1242; A23L 5/11; A23V 2002/00
See application file for complete search history.

(56) References Cited

U.S. PATENT DOCUMENTS

| | | | |
|---|---|---|---|
| 4,602,612 A | | 7/1986 | Schwizer |
| 4,628,903 A | * | 12/1986 | Farnsworth ............. F23C 15/00 126/343.5 A |
| 4,651,712 A | * | 3/1987 | Davis ..................... B08B 3/02 126/110 R |
| 4,668,390 A | * | 5/1987 | Hurley .................. A47J 37/1233 126/369 |
| 4,751,915 A | * | 6/1988 | Price ................... A47J 37/1247 126/391.1 |
| 4,848,318 A | | 7/1989 | Brewer |
| 4,898,151 A | | 2/1990 | Luebke et al. |
| 5,033,368 A | | 7/1991 | Brewer |
| 5,253,566 A | * | 10/1993 | McCabe ............. A47J 37/1247 126/343.5 R |
| 5,887,509 A | | 3/1999 | Russett |
| 6,029,653 A | * | 2/2000 | Tiszai ................. A47J 37/1247 99/403 |
| 2003/0034027 A1 | * | 2/2003 | Yamamoto .......... A47J 37/1247 126/344 |
| 2010/0212510 A1 | | 8/2010 | Hutson et al. |

FOREIGN PATENT DOCUMENTS

| | | |
|---|---|---|
| JP | H04269925 A | 9/1992 |
| JP | H05223245 A | 8/1993 |
| JP | 2001116218 A | 4/2001 |
| WO | 2007004306 A1 | 1/2007 |

OTHER PUBLICATIONS

International Searching Authority, Search Report and Written Opinion issued in International Application No. PCT/US2016/030415 dated Dec. 8, 2016 (14 Pages).

European Patent Office, Extended European Search Report issued in Application No. 16901121.0-1006 dated Nov. 6, 2019 (11 pages).

* cited by examiner

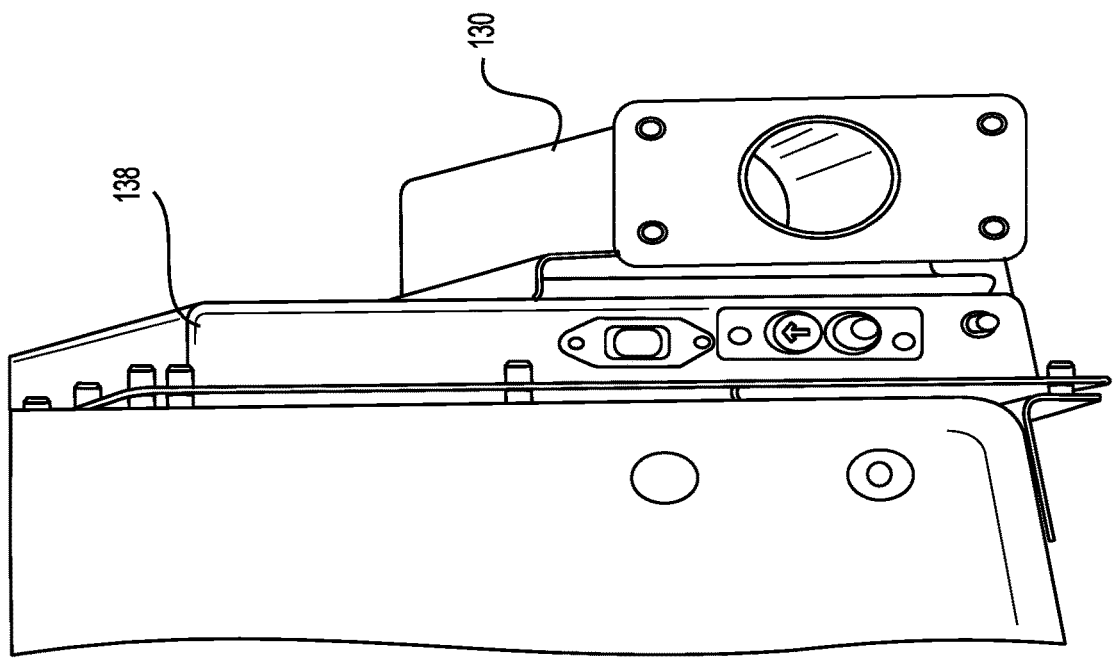
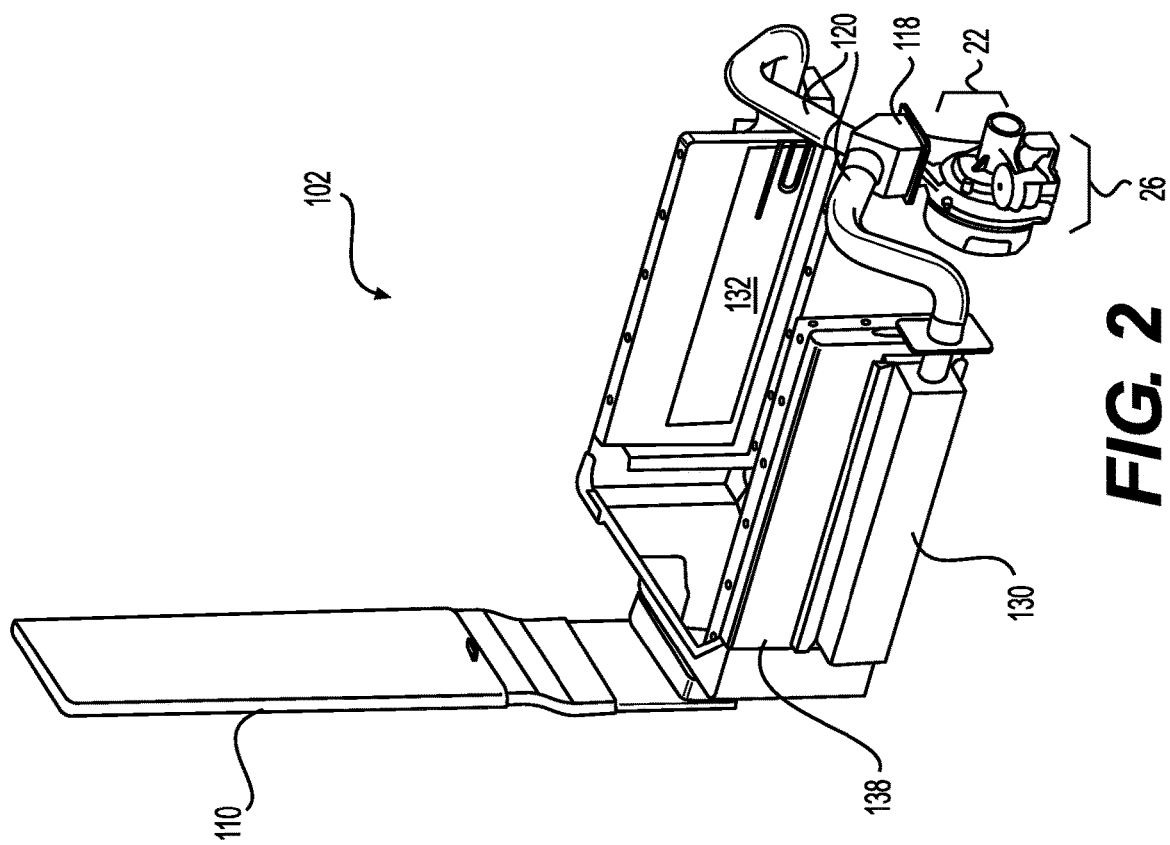

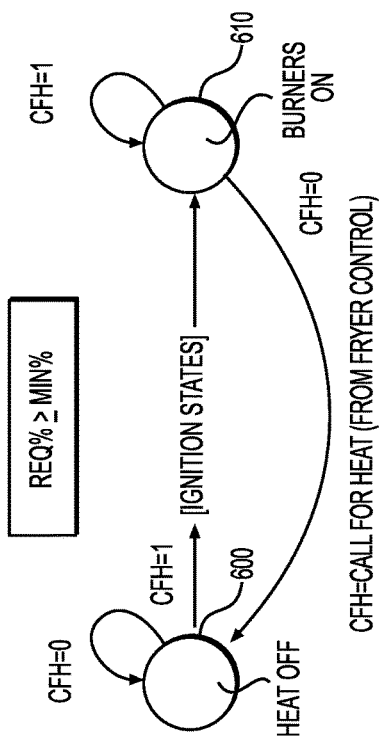
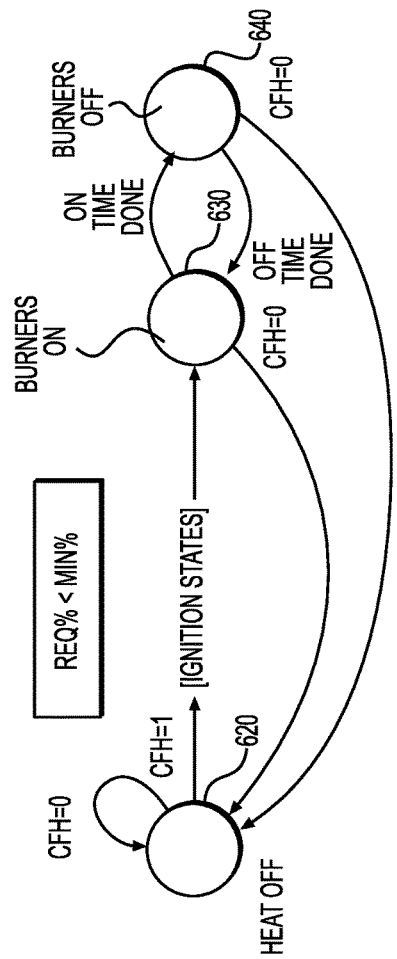
FIG. 12A
FIG. 12B

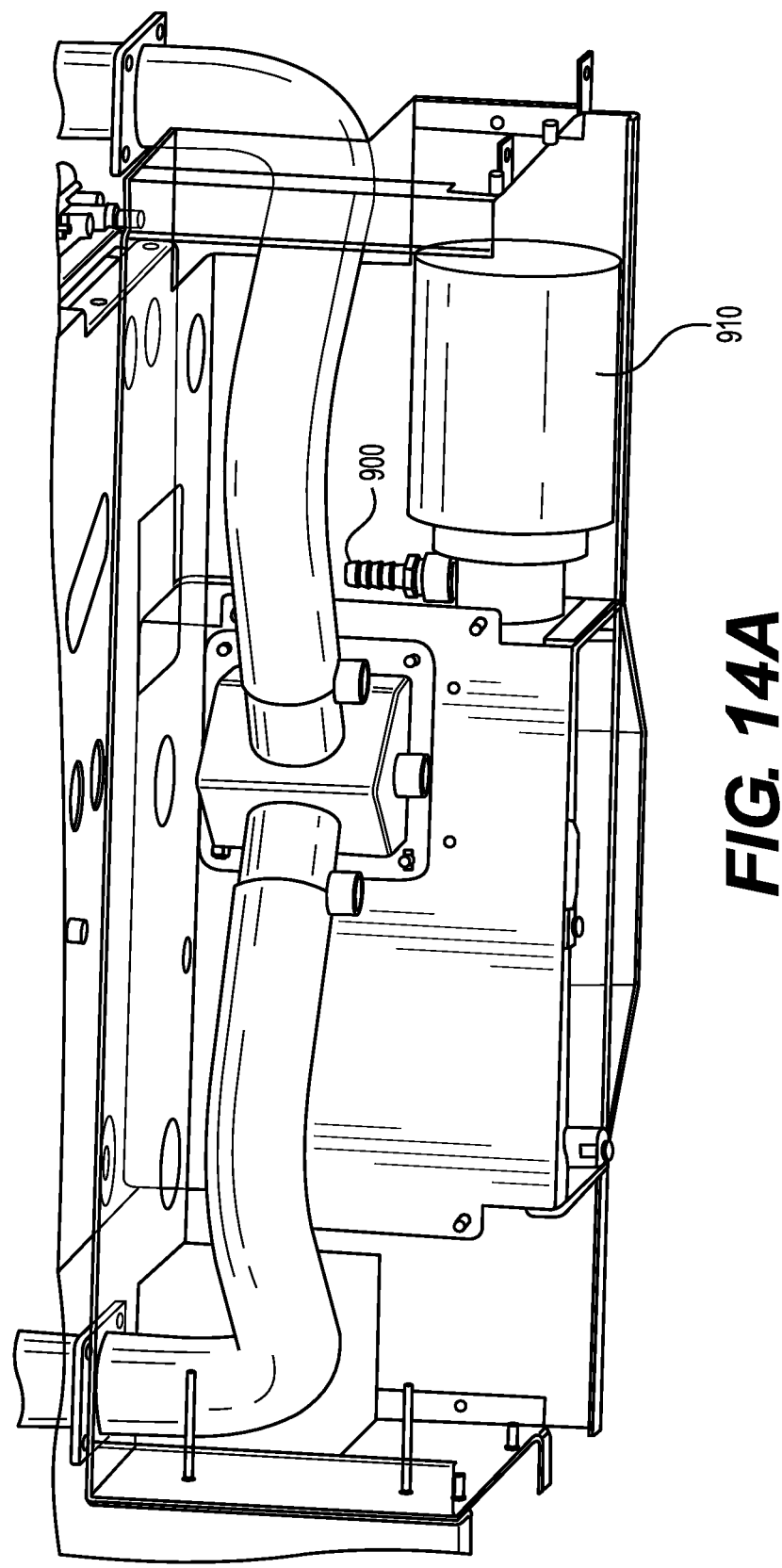

FRYER APPARATUS AND METHOD FOR IMPROVED HEATING CONTROL OF A COOKING CHAMBER OF THE FRYER APPARATUS

BACKGROUND

1. Technical Field

The present disclosure relates generally to cooking apparatus for cooking medium systems (e.g., open/pressure fryers). Specifically, the present disclosure relates to apparatus and method for improving heating control of the cooking apparatus.

2. Description of Related Art

Known cooking apparatuses, such as fryers, are used to cook various food products, e.g., poultry, fish, potato products, and the like. Such cooking apparatuses may include one or more cooking chambers, e.g., fryer pots or vats, which may be filled with a cooking medium, e.g., an oil, a liquid shortening, or a meltable-solid shortening. Such cooking apparatus also may include a heating element, e.g., an electrical heating element such as a heating coil, or a gas heating element such as a gas burner and gas conveying tubes, which heat the cooking medium in the cooking chamber. After the cooking medium reaches a preset cooking temperature, the food products are placed into the cooking medium such that the foods products are cooked in the cooking medium. For example, the food products may be positioned inside a container, e.g., a wire basket, and submerged in the cooking medium for a predetermined amount of time sufficient to cook the food products. The amount of time sufficient to cook or to complete the cooking of the food product at a given cooking temperature depends on the type of food product that is cooked.

To heat the cooking medium in the cooking chamber, known cooking apparatuses may include a heating element located underneath or within the cooking apparatus. Such positioning of the heating element may cause uneven heating of the cooking medium, which in turn affects the desired uniform quality of food product. Moreover, food product near the heat source may be burned and may become infused in the cooking medium. This infusion may adversely affect food quality. Moreover, upon heating the cooking medium, the cooking medium may undergo chemical reactions, e.g., hydrolysis, oxidation, or polymerization, or combinations thereof. These chemical reactions may result in compounds, such as free fatty acids, hydroperoxides, or polymerized triglycerides, or combinations thereof. In addition, such reactions may reduce the viscosity of the cooking medium, which may also adversely affect cooking performance. In some instances, such changes to the cooking medium do not become apparent until significant change has occurred. These chemical reactions and flavor infusions may shorten the useful life of the cooking medium, and may result in more frequent replacement of cooking medium. Therefore, it may be economically beneficial to extend the useful life of such cooking media by increasing the uniformity and temperature control of the cooking medium, to avoid burning food product and tainting cooking medium. Furthermore, it is advantageous to be able to uniformly heat cooking medium within a cooking chamber without having any heating mechanism located within the cooking chamber.

In addition to affecting the quality of food product and cooking medium, prior cooking apparatuses have heating systems that are inefficient, resulting in temperature fluctuation of the cooking medium. These issues are prevalent in gas-powered fryers where there are hot spots and it is more difficult to heat the cooking medium at an even temperature. These inefficiencies are due to the lack of precise control of the heating system as well as ineffective heat transfer between the heating system and the cooking medium. Conventional gas fryers utilize a pull through system where airflow is drawn through the heater by a means downstream from the burner, which limits precise temperature control. Thus, it may be commercially beneficial to increase both the precision of the heating system and its ability to uniformly transmit heat to the cooking medium, using a more active push-through control of airflow through the burner.

SUMMARY

In an embodiment of the present disclosure, a fryer apparatus comprises a cooking chamber configured to hold a cooking medium and configured to receive food product, a heater disposed external to the cooking chamber, wherein the heater is configured to heat the cooking medium, and a fuel system disposed external to the cooking chamber. The fryer apparatus further comprises wherein the fuel system is configured to deliver an air-fuel mixture to the heater, the fuel system is configured to control the temperature of the heater, and the fuel system is configured to control a temperature of the heater by varying the velocity of an airflow. Furthermore, the fuel system comprises a blower configured to propel the airflow to the heater and a fuel injector configured to inject fuel into the airflow to create the air-fuel mixture.

In another embodiment of the present disclosure, a method of heating cooking medium of a fryer apparatus comprises receiving an instruction to heat a cooking chamber configured to hold a cooking medium and configured to receive food product, in response to receiving the instruction, initiating a fuel system disposed external to the cooking chamber. The method further comprises wherein the fuel system comprises a blower configured to propel an airflow to a heater, and a fuel injector configured to inject fuel into the airflow to create an air-fuel mixture. The method further comprises initiating the blower, initiating the fuel injector, and initiating the heater disposed external to the cooking chamber, wherein the heater is configured to heat the cooking medium by igniting the air-fuel mixture. The method further comprises wherein the step of initiating the blower comprises controlling a velocity of the airflow to control a temperature of the cooking medium in the cooking chamber.

In another embodiment of the present disclosure, a method of heating cooking medium of a fryer apparatus comprises receiving an instruction to heat a cooking chamber configured to hold a cooking medium and configured to receive food product, creating an airflow external to the cooking chamber using a blower, and adding fuel to the airflow, via a fuel injector, to create an air-fuel airflow. The method further comprises igniting the air-fuel airflow, via a heater, to heat the cooking chamber in accordance with the instruction, wherein the step of creating the airflow comprises controlling a speed of the airflow to control a temperature of the cooking medium in the cooking chamber.

Other objects, features, and advantages of the present disclosure are apparent to persons of ordinary skill in the art in view of the following detailed description of the present disclosure and the accompanying drawings.

BRIEF DESCRIPTION OF THE DRAWINGS

For a more complete understanding of the present disclosure, needs satisfied thereby, and objects, features, and advantages thereof, reference now is made to the following description taken in connection with the accompanying drawings.

FIG. 2 shows a view of a heater of the fryer apparatus, according to a non-limiting embodiment of the present disclosure.

FIG. 3 shows a view of a portion of the heater of the fryer apparatus, according to a non-limiting embodiment of the present disclosure.

FIGS. 12A and 12B show a heat system control diagram for a fryer apparatus system, according to a non-limiting embodiment of the present disclosure.

FIGS. 14A and 14B show an air filtering system for a fryer apparatus system, according to a non-limiting embodiment of the present disclosure.

DETAILED DESCRIPTION OF PREFERRED EMBODIMENTS

Preferred embodiments of the present disclosure, and their features and advantages, may be understood by referring to FIGS. 1-14B, like numerals being used for corresponding parts in the various drawings.

Figure 1:
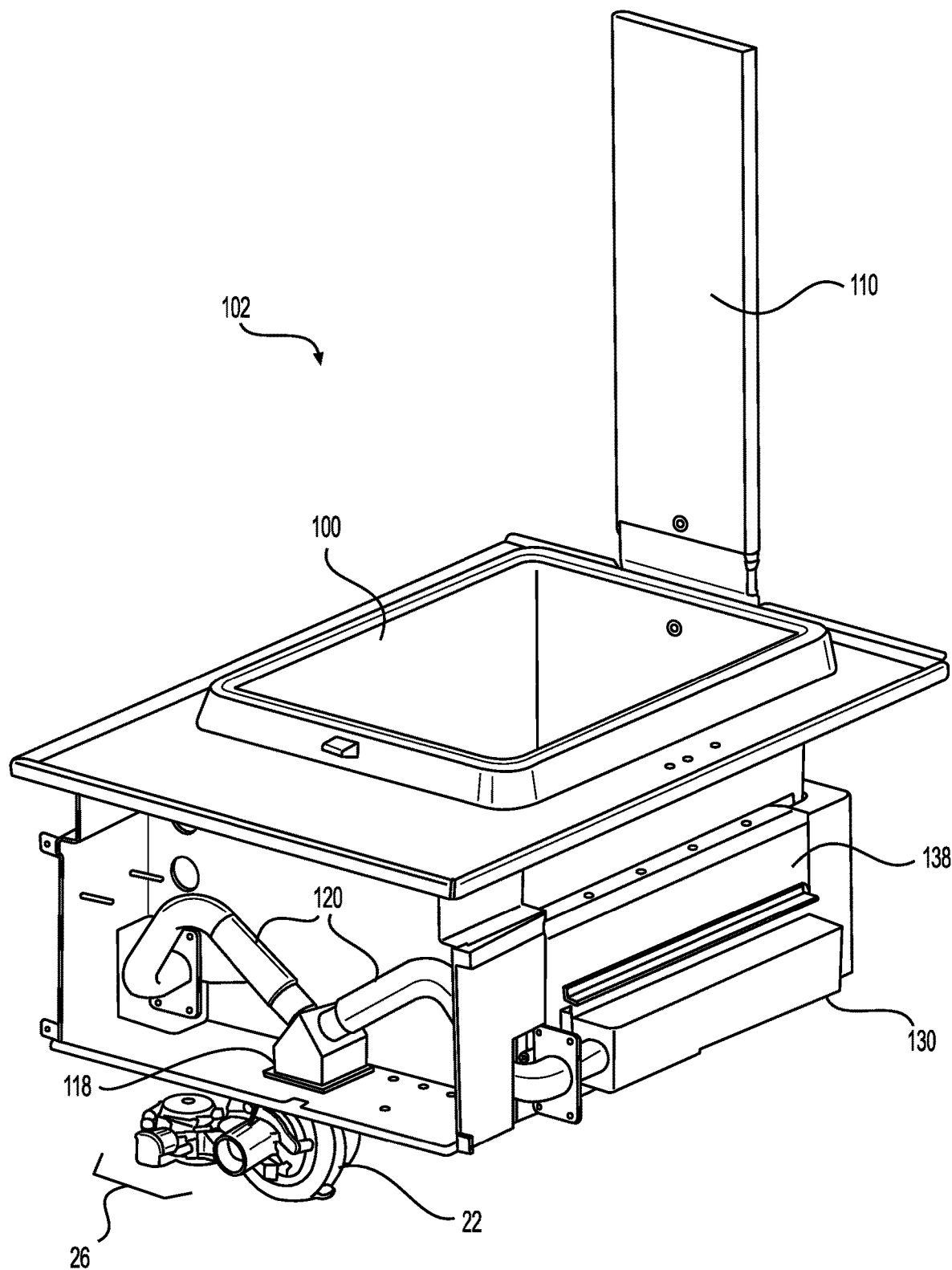
FIG. 1 shows a fryer apparatus, according to a non-limiting embodiment of the present disclosure.
Figure 4B:
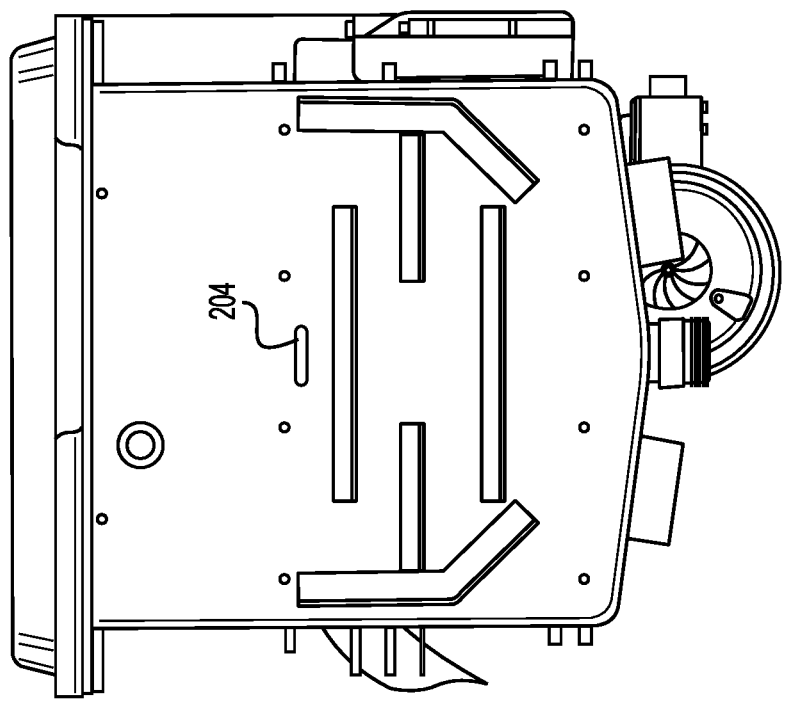
FIGS. 4A and 4B show a first heat transfer system of the heater located external to a cooking chamber, according to a non-limiting embodiment of the present disclosure.
Figure 4A:
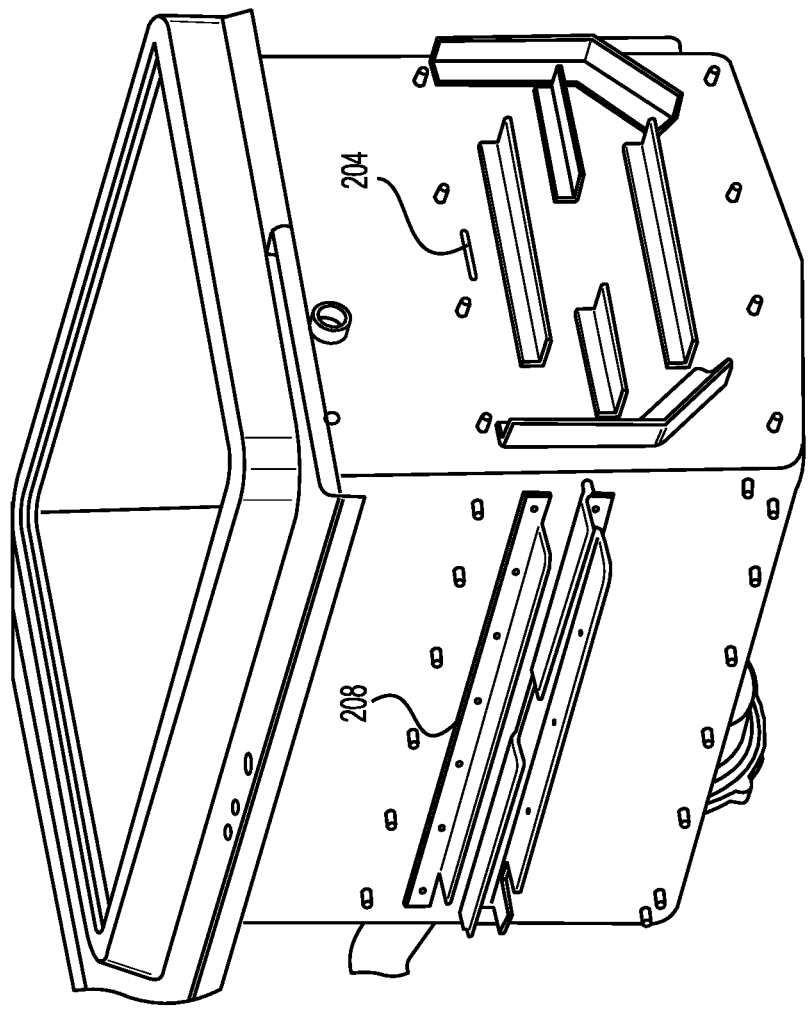
Figure 4C:
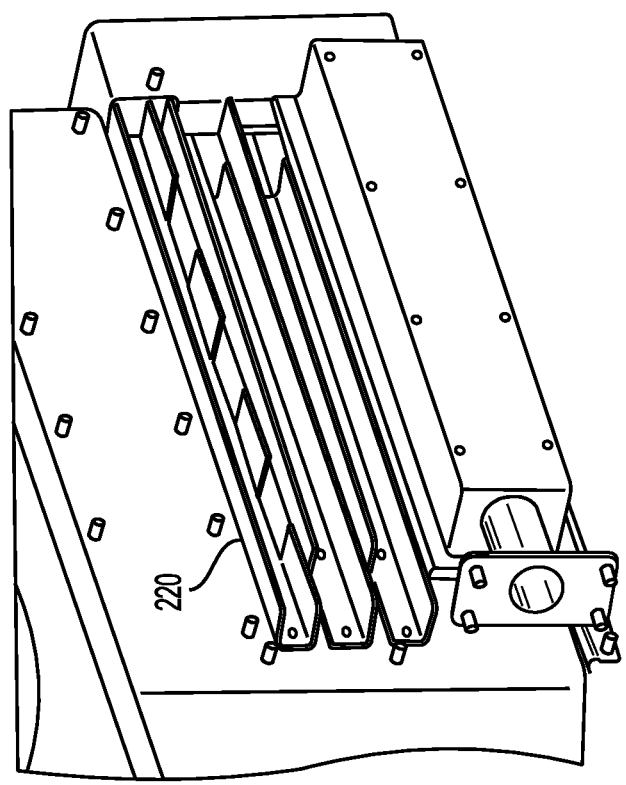
FIGS. 4C and 4D show a second heat transfer system of the heater located external to a cooking chamber, according to a non-limiting embodiment of the present disclosure.
Figure 4D:
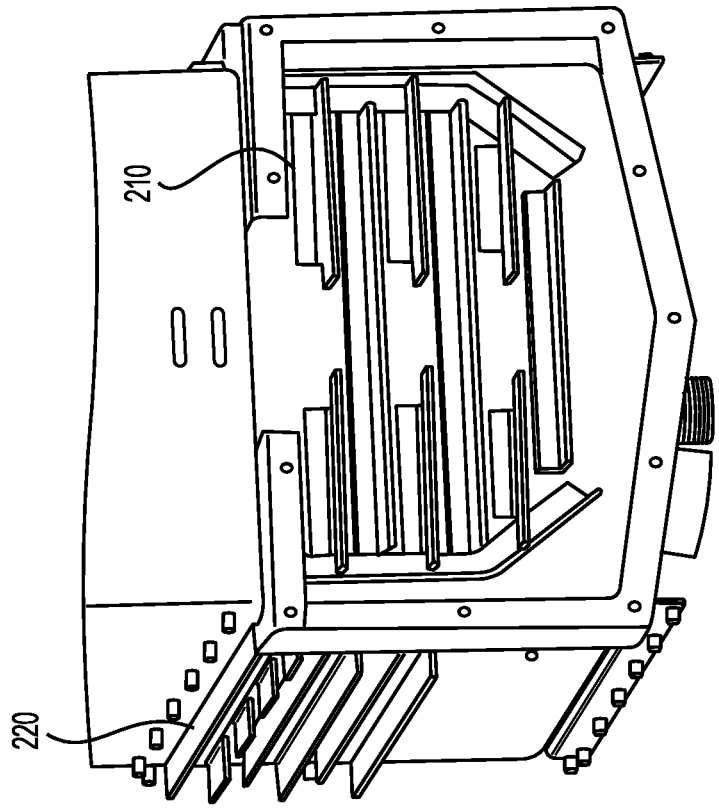
Figure 4E:
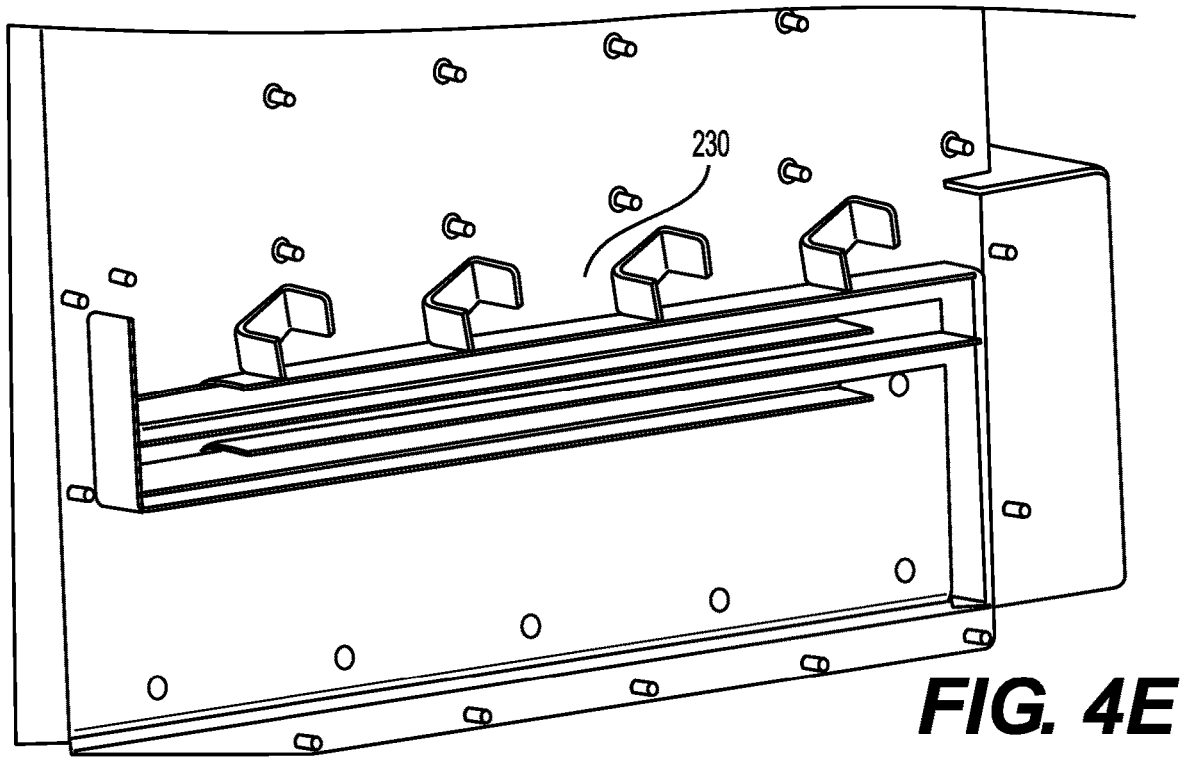
FIGS. 4E and 4F show a third and fourth heat transfer system of the heater located external to a cooking chamber, according to a non-limiting embodiment of the present disclosure.
Figure 4F:
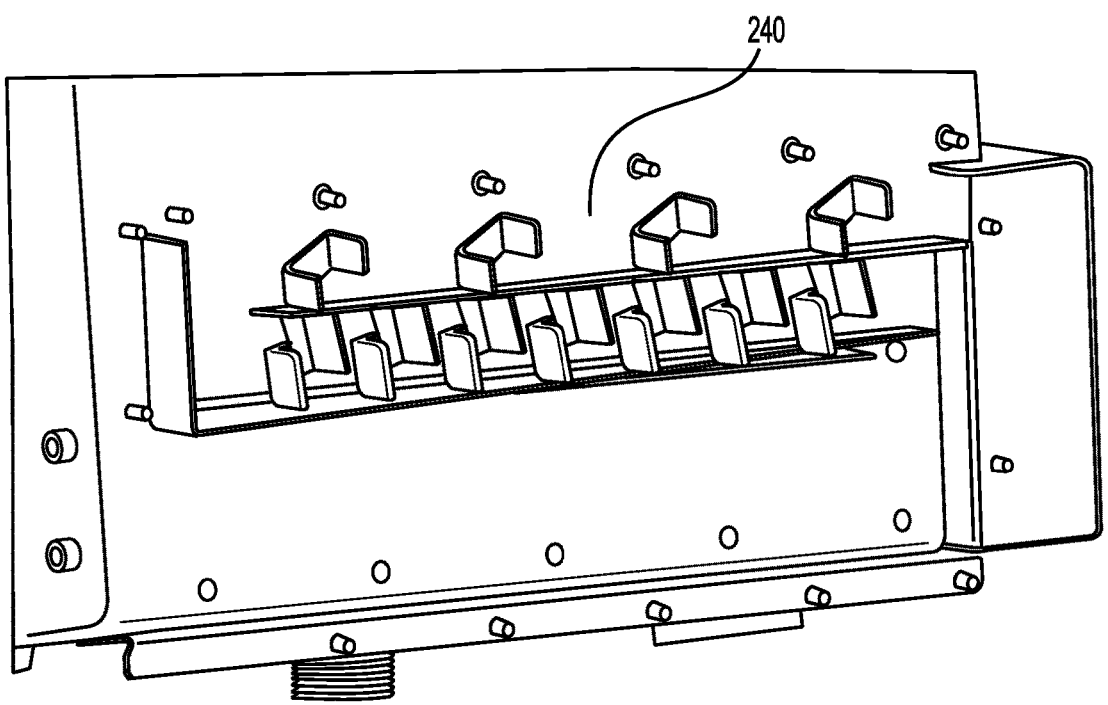

Referring to FIG. 1, a fryer apparatus 102 according to an embodiment of the present disclosure is shown. Fryer apparatus 102 includes a cooking chamber 100 configured to be filled with a cooking medium. In addition, cooking chamber 100 may receive a food product. The cooking medium may be oil, a liquid shortening, a meltable-solid shortening, or the like. Cooking chamber 100 may include a singular pot as shown in FIG. 1, or a plurality of pots to simultaneously cook a variety of food products. An external source of the cooking medium may be provided and a pump may be used to provide the cooking medium to the cooking chamber 100. A fuel system may include a blower 22, a fuel injector 26, a manifold 118, a distribution conduit 120, and an outlet flue 110. A heater may include burner section 130 and heat exchange system 138.

Referring to FIG. 2, the heater of the fryer apparatus 102 according to a non-limiting embodiment of the present disclosure is shown. Blower 22 may be configured to propel an airflow through manifold 118 and distribution conduit 120 to the heater. Fuel injector 26 may be configured to inject fuel into the airflow created by the blower 22, resulting in an air-fuel mixture flowing through the fueling and heater. Fuel injector 26 may be configured to inject any combustible fluid or gas, such as, for example, propane.

The heater of fryer apparatus 102 may contain burner 132, burner section 130, and heat exchange system 138. Once an air-fuel mixture is flowing through the heater, burner 132 may be ignited in order to heat cooking chamber 100 by burning the air-fuel mixture. Burner 132 is contained in burner section 130, which provides a combustion compartment and traps heat against the side of cooking chamber 100. Burner 132 may be an infrared and/or radiant burner. Furthermore, burner 132 may have a concave surface facing the cooking chamber to more efficiently transfer heat to the cooking chamber 100. Although FIG. 2 shows a burner 132 and burner section 130 on two sides of the cooking chamber 100, any number of burners may be used with the fryer apparatus 102 of the present disclosure. In addition, heat exchange system 138 may disperse heat from burner 132 alongside cooking chamber 100. Such dispersion provides efficient and uniform heat to a cooking medium within the cooking chamber 100. Subsequent to the burning process, the blower 22 may blow out any byproduct of the heater and leftover traces of air-fuel mixture through the outlet flue 110.

Referring to FIG. 3, the heat exchange system 138 and the burner section 130 of the fryer apparatus 102 are shown, according to a non-limiting embodiment of the present disclosure. FIG. 3 shows a connection input on the burner section 130 for the distribution conduit 120. Additionally, burner section 130 may be connected externally to the cooking chamber 100 near, for example, the base of the cooking chamber 100. The heat exchange system 138 may extend above the burner section 130 in order to efficiently collect and disperse heat along the side of the cooking chamber 100. In addition, burner section 130 may be attached externally to any part of the cooking chamber 100. Furthermore, additional configurations of the heat exchange system 138 relevant to the burner section 130 are considered. The fryer apparatus 102 of the present disclosure is advantageous because it promotes uniform heating of the cooking medium without any heating systems within the cooking chamber 100.

Figure 6:
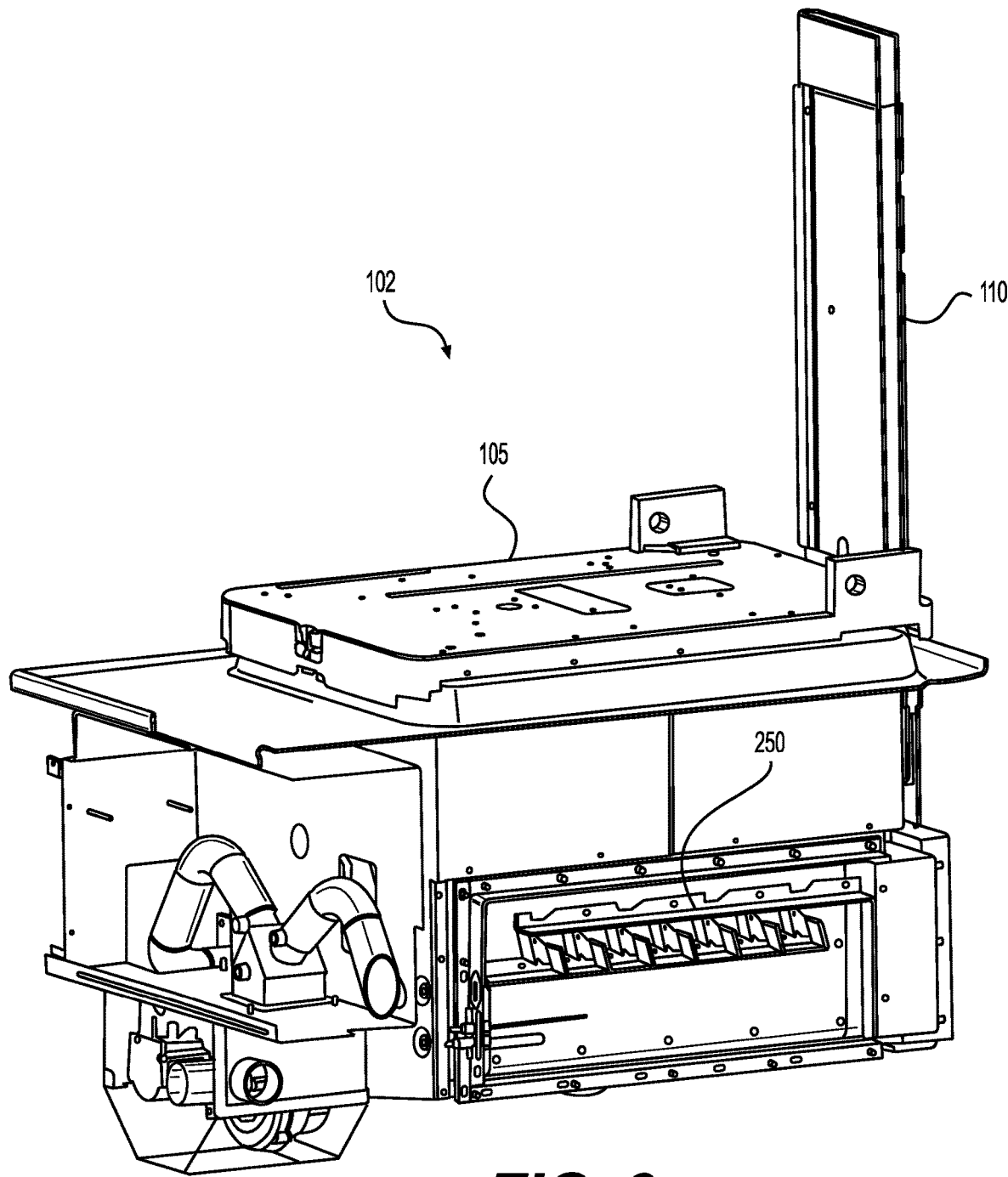
FIG. 6 shows a side perspective view of a fryer apparatus, including a fifth heat transfer system of the heater, according to a non-limiting embodiment of the present disclosure.

Referring to FIGS. 4A-4F, several non-limiting embodiments of the heat exchange system 138 of the fryer apparatus 102 are shown. Each embodiment of the heat exchange system may improve flow balancing by dispersing heat emanating from the burner 132 and heat exchange section 138 among the exterior of the cooking chamber 100. The shown embodiments may be enclosed within heat exchange section 138, which connects to both the burner section 130 and outlet flue 110. By dispersing the heat among the exterior of the cooking chamber 100, the cooking medium within the cooking chamber 100 may maintain a uniform temperature during cooking of food product. Furthermore, the heat exchange system 138 may extend to the posterior of the cooking chamber 100, at a position below the outlet flue 110. As such, the cooking chamber 100 may receive heat transfer from multiple sides. Furthermore, in some non-limiting embodiments of the present disclosure, the heat exchange system 138 may also extend around the front of the cooking chamber 100 and/or below the cooking chamber 100 (not shown). Regarding FIGS. 4A-4F, baffles 204, 208, 210, 220, 230, and 240 direct and disperse hot air emanating from the burner 132 and heat exchange section 138. As shown in FIGS. 4A-4F, baffles 204, 208, 210, 220, 230, and 240 may be contained within heat exchange section 138. Heat exchange section 138 may trap heat emanating from burner 132 such that baffles 204, 208, 210, 220, 230, and 240 may disperse the heat within the enclosure. In addition, FIG. 6 shows baffle 250, which directs and disperses hot air along the cooking chamber 100. Baffles may be made from stainless steel or any suitable material that is cost effective and capable of withstanding the necessary temperatures for the described environment.

Figure 5:
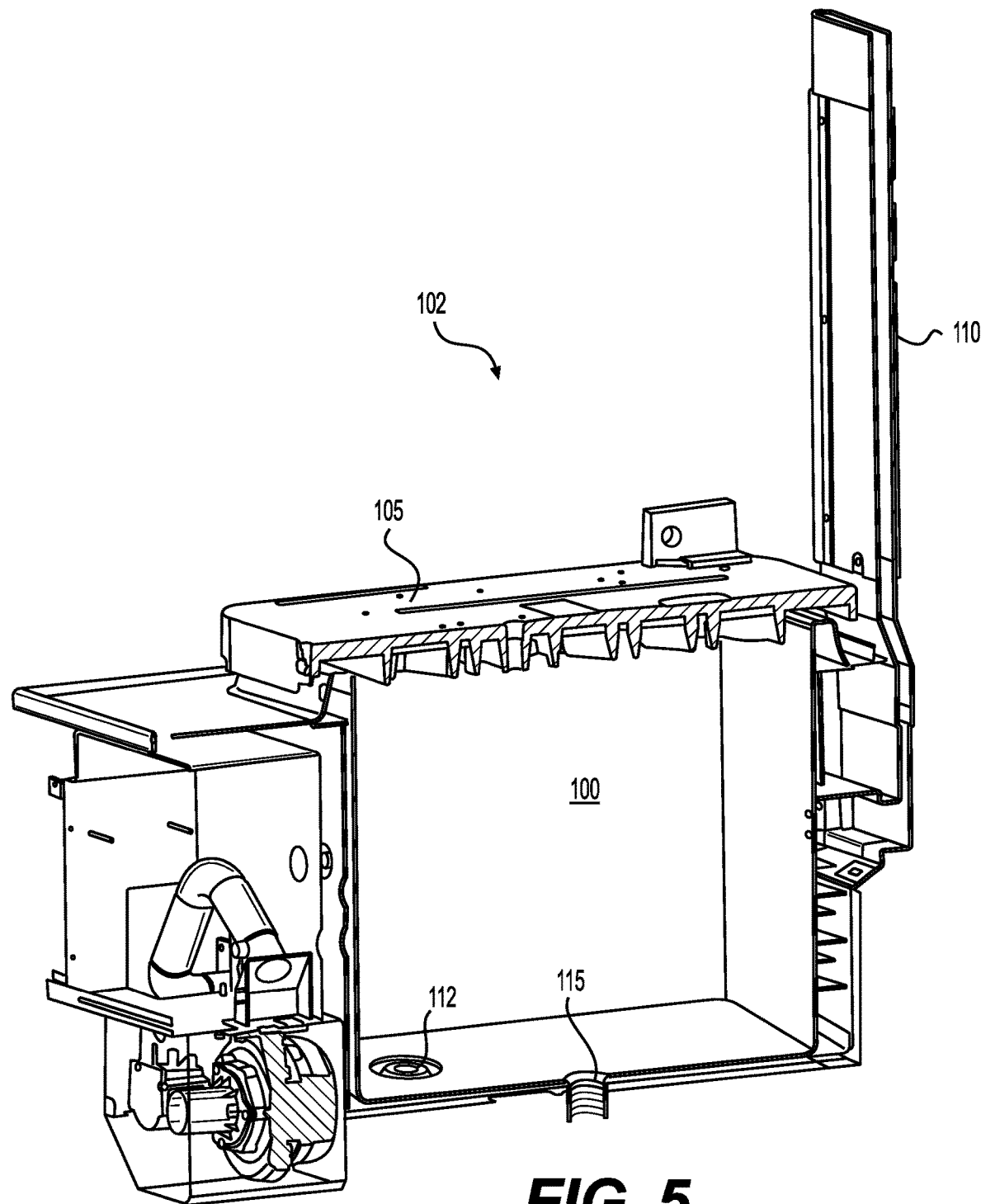
FIG. 5 shows a lateral cross sectional view of a fryer apparatus, according to a non-limiting embodiment of the present disclosure.

FIG. 5 shows a lateral cross-sectional view of a fryer apparatus, according to a non-limiting embodiment of the present disclosure. A cross sectional view of the relationship between heat exchange system 138 and outlet flue 110 is shown. In addition, cooking chamber 100 may comprise lid 105, enabling pressure cooking of food product within cooking chamber 100. Drain 115 enables removal of cooking medium from cooking chamber 100. Furthermore, port 112 is for pumping oil into the cooking chamber 100. A cover (not shown) on port 112 may create a horizontal spray of oil across the bottom of the cooking chamber 100 to help loosen and wash away leftover food product and cooking medium.

Figure 7:
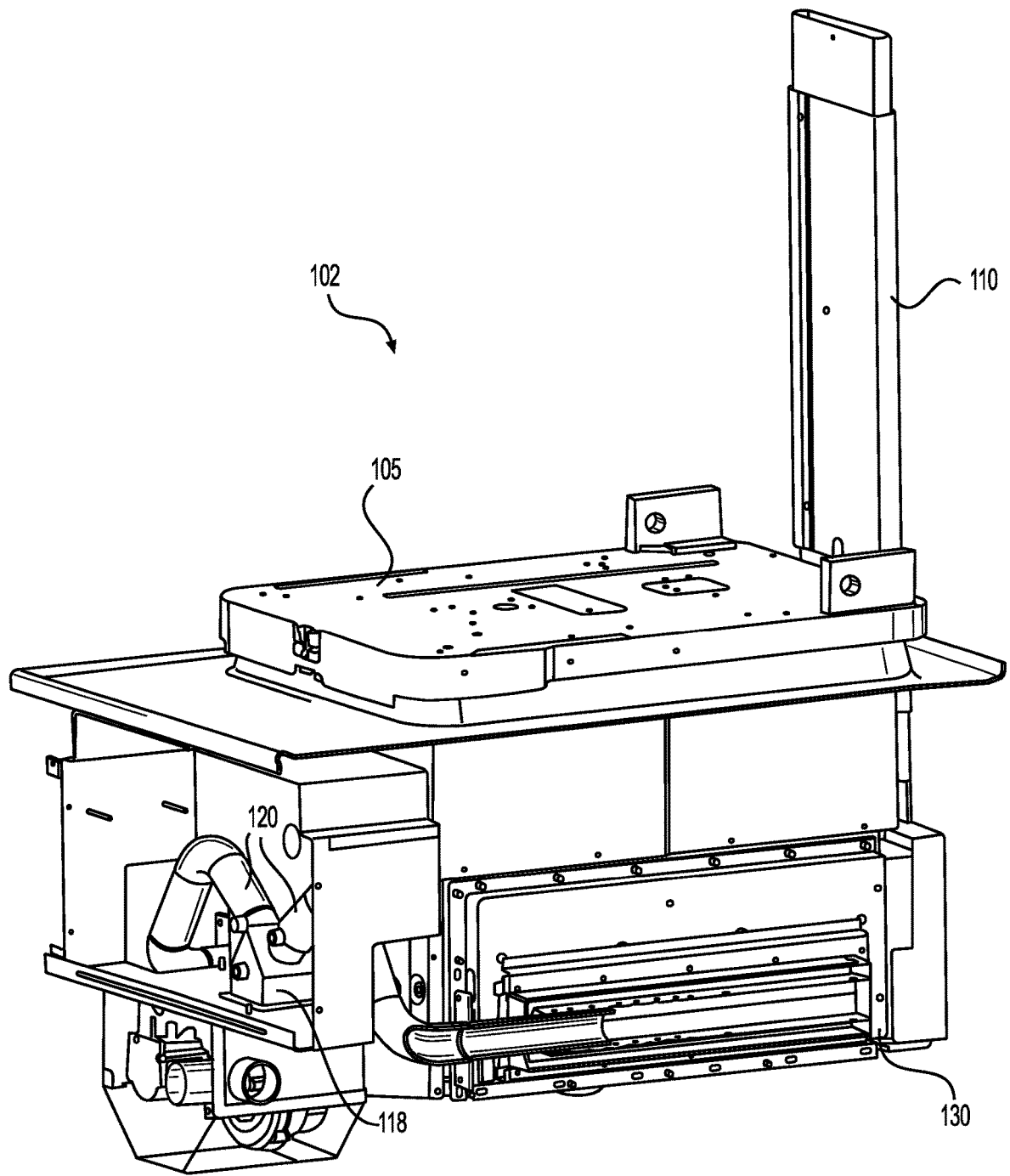
FIG. 7 shows a side perspective view of the heater, according to a non-limiting embodiment of the present disclosure.

FIG. 7 shows a lateral perspective view of the heater, according to a non-limiting embodiment of the present disclosure. FIG. 7 illustrates the relationship between distribution conduit 120 and burner section 130. An air-fuel mixture is pushed through the distribution conduit 120 by blower 22 into the burner section 130. After ignition, burner 132 will consume the air-fuel mixture, and distribute hot air throughout the heater and out the outlet flue 110. In addition, a significant transfer of heat may occur by radiation or infrared heat directly from the burner 132 to the sidewall of the cooking chamber 100. In some non-limiting embodiments of the present disclosure, a blackbody may be located on the exterior wall of the cooking chamber 100 between the burner 132 and the exterior wall of the cooking chamber 100. The blackbody may increase the percentage of heat emitted from burner 132 that is transmitted to cooking chamber 100. The blackbody may absorb all electromagnetic waves radiated from burner 132. Furthermore, the blackbody may emit the electromagnetic waves to the cooking chamber 100, thereby efficiently transferring heat to the cooking chamber 100.

Figure 8:
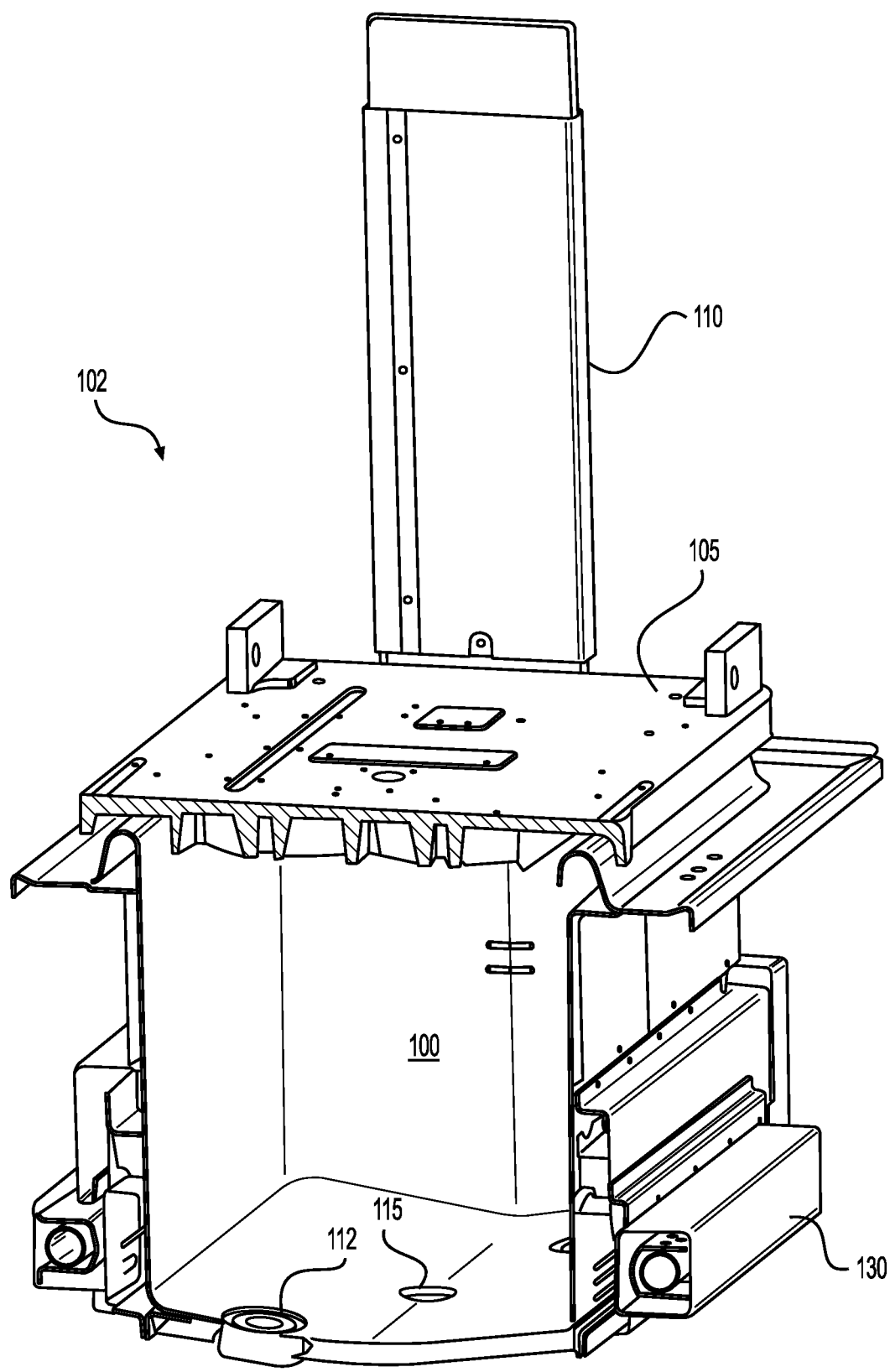
FIG. 8 shows a front cross sectional view of a fryer apparatus, according to a non-limiting embodiment of the present disclosure.

FIG. 8 shows a front cross-sectional view of fryer apparatus 102, according to a non-limiting embodiment of the present disclosure. Similar to FIG. 5, FIG. 8 illustrates drain 115 and port 112 within cooking chamber 100. In addition, burner section 130 is shown attached to the exterior of the cooking chamber 100.

Figure 9:
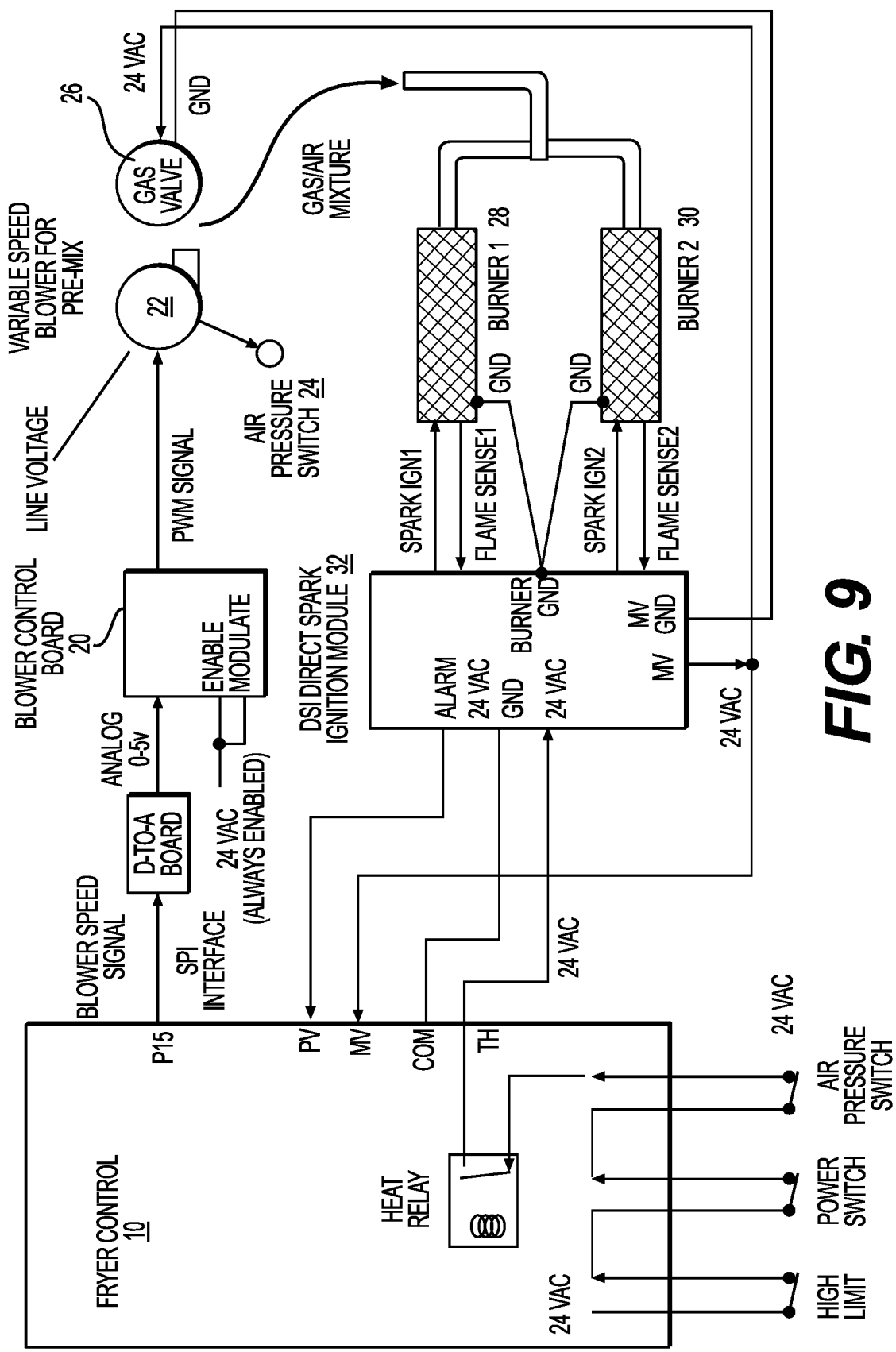
FIG. 9 shows a simplified component diagram for a fryer apparatus system, according to a non-limiting embodiment of the present disclosure.

FIG. 9 shows a simplified component diagram for fryer apparatus 102, according to a non-limiting embodiment of the present disclosure. Fryer control 10 may receive instructions from a user, wherein the instructions may include a requested temperature of the cooking medium. Fryer control 10 may comprise a processor configured to load instructions from a user or a hard disk into a memory and execute the described heating process using those instructions. Fryer control 10 may send a blower speed signal to a blower control board 20. Blower control board 20 may generate a pulse width modulation (PWM) signal to control blower 22. In another non-limiting embodiment of the present disclosure, fryer control 10 may directly generate the pulse width modulation (PWM) signal to control the blower 22. An air pressure switch 24 may close when airflow from blower 22 reaches an acceptable level. An ignition module 32 may not be activated until air pressure switch 24 is closed.

Prior to initiating an ignition module 32 and a fuel injector/gas valve 26, the blower 22 may perform a pre-purge process in which the blower 22 creates an airflow through the system to prepare the airway for the air-fuel mixture. In addition, the ignition module 32 may be on a pre-purge delay, during which the ignition module 32 delays activation until the blower 22 completes the pre-purge process. Similarly, fryer control 10 may implement a post-purge process by leaving the blower 22 activated after the burners 28 and 30 are deactivated.

After the pre-purge process, the ignition module 32 and the burners 28 and 30 may be activated. In addition, the ignition module 32 may monitor burners 28 and 30 to determine whether they are lit. If the ignition module 32 determines that at least one of the burners 28 and 30 are not ignited within a predetermined timeframe, the ignition module 32 may signal the system to shut down and activate an alarm output (optional). Absent this reaction within the predetermined timeframe, the fryer control 10 determines that the burners 28 and 30 are lit. Furthermore, if either burner 28 or 30 fails to ignite, or the blower 22 fails in any manner, both burners 28 and 30 may shut down. In addition, a failed ignition may be determined by monitoring the ignition module 21. For example, a failed ignition may be detected by determining whether the ignition module 32 has turned off the main valve signal ("MV"), which disables the gas flow.

Figure 10:
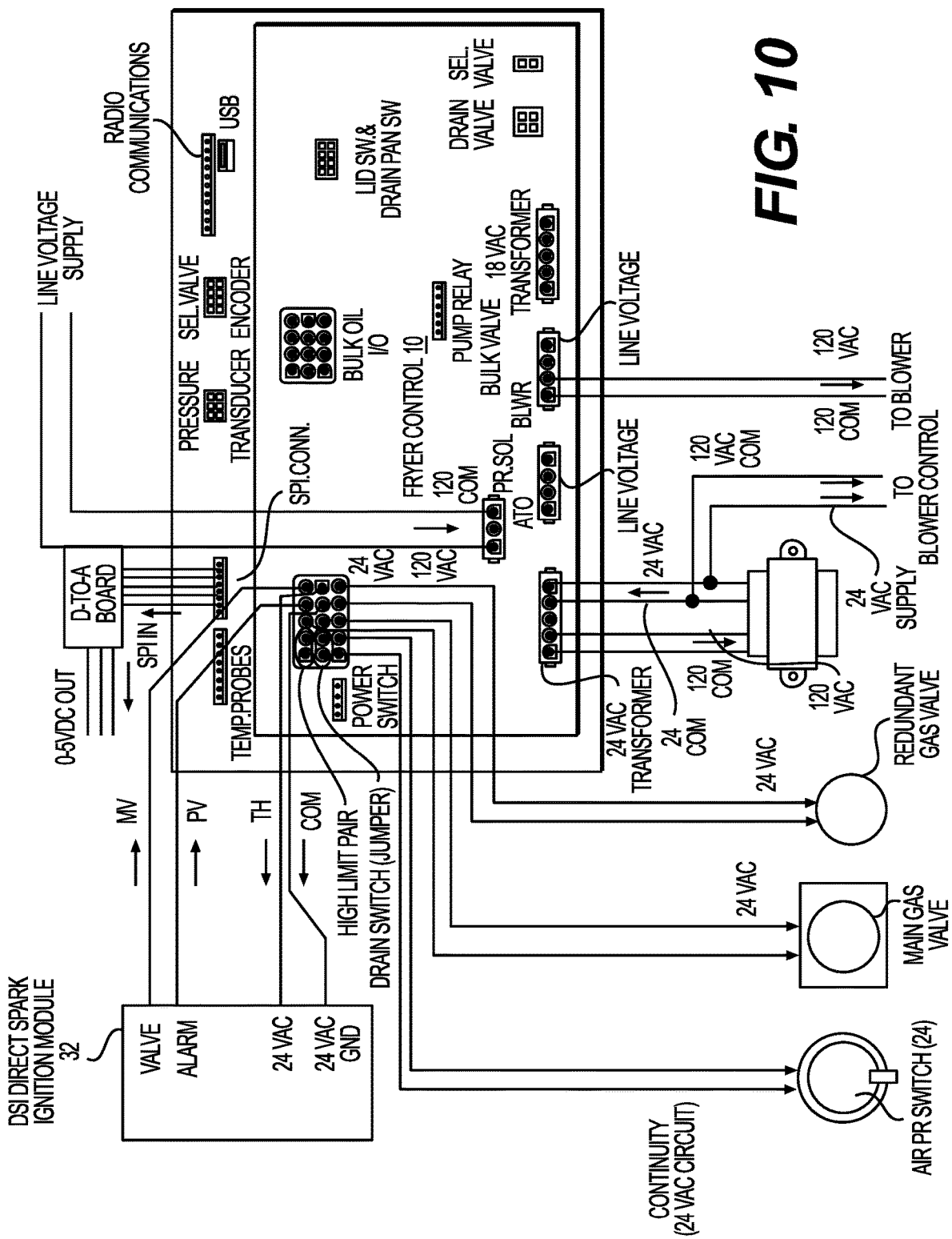
FIG. 10 shows a control board connection diagram for a fryer apparatus system, according to a non-limiting embodiment of the present disclosure.

FIG. 10 shows a control board connection diagram for the fryer apparatus 102, according to a non-limiting embodiment of the present disclosure. FIG. 10 illustrates the connection relationship between fryer control 10 and ignition module 32, air pressure switch 24, gas valve 26, and blower control board 20.

Figure 11:
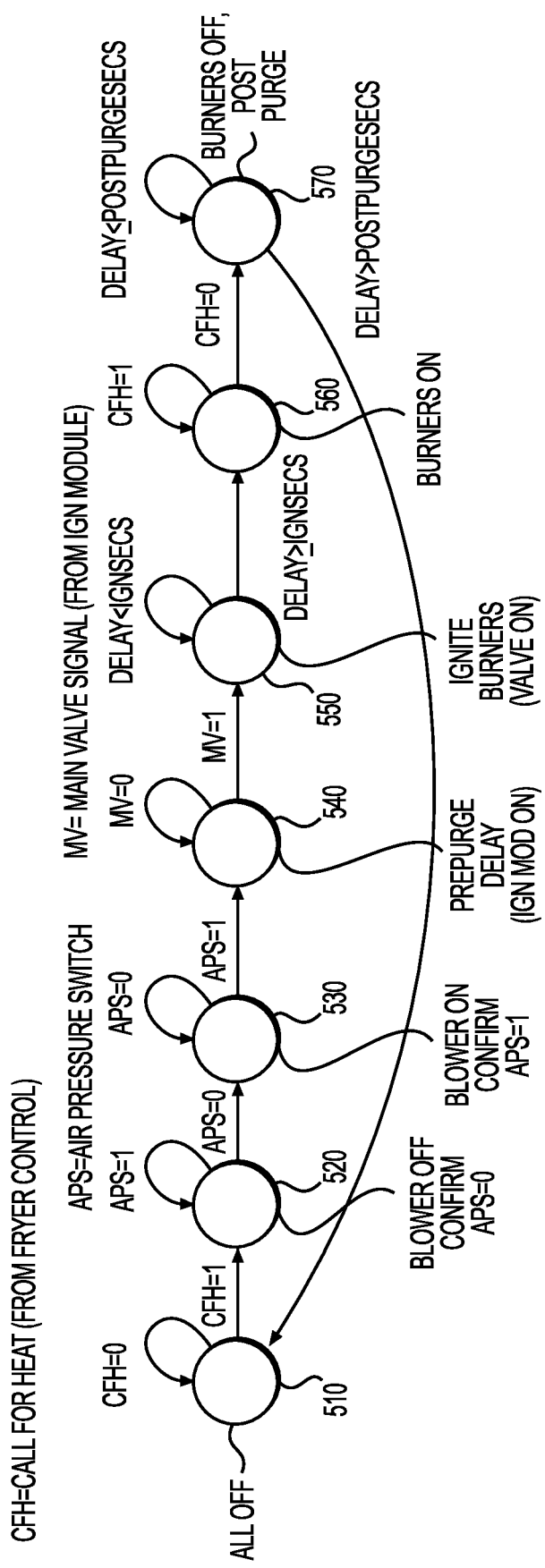
FIG. 11 shows a simplified operational flow diagram for a fryer apparatus system, according to a non-limiting embodiment of the present disclosure.

In FIG. 11, a simplified operational flow diagram for the fryer apparatus 102 is shown, according to a non-limiting embodiment of the present disclosure. In step 510, the fryer apparatus 102 is dormant and awaiting activation. In step 520, upon receiving a call for heat ("CFH") from fryer control 10, the multi-step ignition sequence is initiated. If there is no call for heat, the fryer apparatus 102 remains dormant. In step 520, when the blower 22 is deactivated, the fryer control 10 determines that the air pressure switch 24 is open (APS=0). Next, the blower 22 is activated and fryer control 10 waits until air pressure switch 24 closes (APS=1). After air pressure switch 24 closes as shown in step 530, the system has a proven fan and fryer control 10 may proceed with ignition.

In step 540, the ignition module 32 initiates a pre-purge delay prior to initiating ignition. During the pre-purge delay, the blower 22 may perform a predetermined amount of complete exchanges of air through the system to exhaust combustible gas and create an airflow. Ignition module 32 may not be powered unless both blower 22 and air pressure switch 24 are on. In step 540, gas valve is not activated (MV=0). In step 550, ignition module 32 delays a predetermined amount of time prior to activating gas valve 26 and activating the ignition of burner 132 as shown in step 560. Activation of the gas valve 26 (MV=1) indicates the pre-purge process is complete. In addition, for example, if a user desires a 15 second pulse of heat, the timing begins during step 560 when burner 132 is on. Loss of a gas valve signal during step 560 may indicate ignition failure, during which the ignition module 32 may shut down if it fails to sense flame from the burner 132. In step 570, a post-purge process clears the system after burner 132 has been deactivated. During the post-purge process, blower 22 continues to remain active after burner 132 is shut down in order to create an airflow to send hot exhaust and/or fuel out through the outlet flue 110. Similar to the pre-purge process, the post-purge process may send a predetermined number of cycles of air through the system before completion.

FIGS. 12A and 12B show a heat system control diagram for a fryer apparatus 102, according to a non-limiting embodiment of the present disclosure. FIG. 12A illustrates the procedure when the requested heating rate is greater than or equal to the minimum rate. The minimum rate may be defined by either a lower operation bound of the blower 22 or a lower bound at which combustion is not reliable. The requested heating rate may be defined as a percentage of the system's full heating capacity. One way to control heating rate may be to adjust the operation speed of the blower 22. Specifically, increasing the speed of the blower 22 increases the air-fuel mixture flow throughout the system, thereby increasing burn rate and heat. Blower speed of blower 22 may run from the minimum rate to a maximum rate at full capacity. In other non-limiting embodiments of the present disclosure, heating rate may be controlled by varying the amount of fuel injected into the airflow created by blower 22.

If there is no call for heat, as shown in step 600, the blower 22 and the burner 132 may remain dormant, unless the blower 22 is performing the post-purge process discussed above. In step 610, when the requested heating rate of the call for heat is greater than or equal to the minimum rate, the burner 132 may be ignited and the blower 22 may be set at a speed commensurate with the requested heating rate until the call for heat request is satisfied and the fryer control 10 indicates no additional heating is necessary.

FIG. 12B illustrates the procedure when the requested heating rate is less than the minimum rate. If the requested heating rate is less than the minimum rate, either the blower is unable to run that slowly or combustion at such low speeds is unreliable. Instead of running the burner 132 and the blower 22 continuously, the system may pulse the burner 132 on and off to achieve the desired effect of the requested heating rate, as shown in steps 630 and 640. Fryer control 10 may calculate the necessary blower speed and duty cycle that result in the requested heating rate. For example, the fryer control 10 may determine a blower speed B % and a burner duty cycle D %, such that B %×D %=requested heating rate. For example, a request for 20% heating rate might be achieved by running the blowing mechanism at 40% and pulsing the heat on and off at a 50% duty cycle. As shown in steps 630 and 640, a burner may be cycled on and off according to a calculated duty cycle. If the 'off' period of the pulsing process is short, the blower 22 may remain on. However, if the 'off' period is significant, the blower 22 may be deactivated after the post-purge process is completed, as shown in step 620. The blower 22 may then be restarted for the next heat pulse.

Figure 13A:
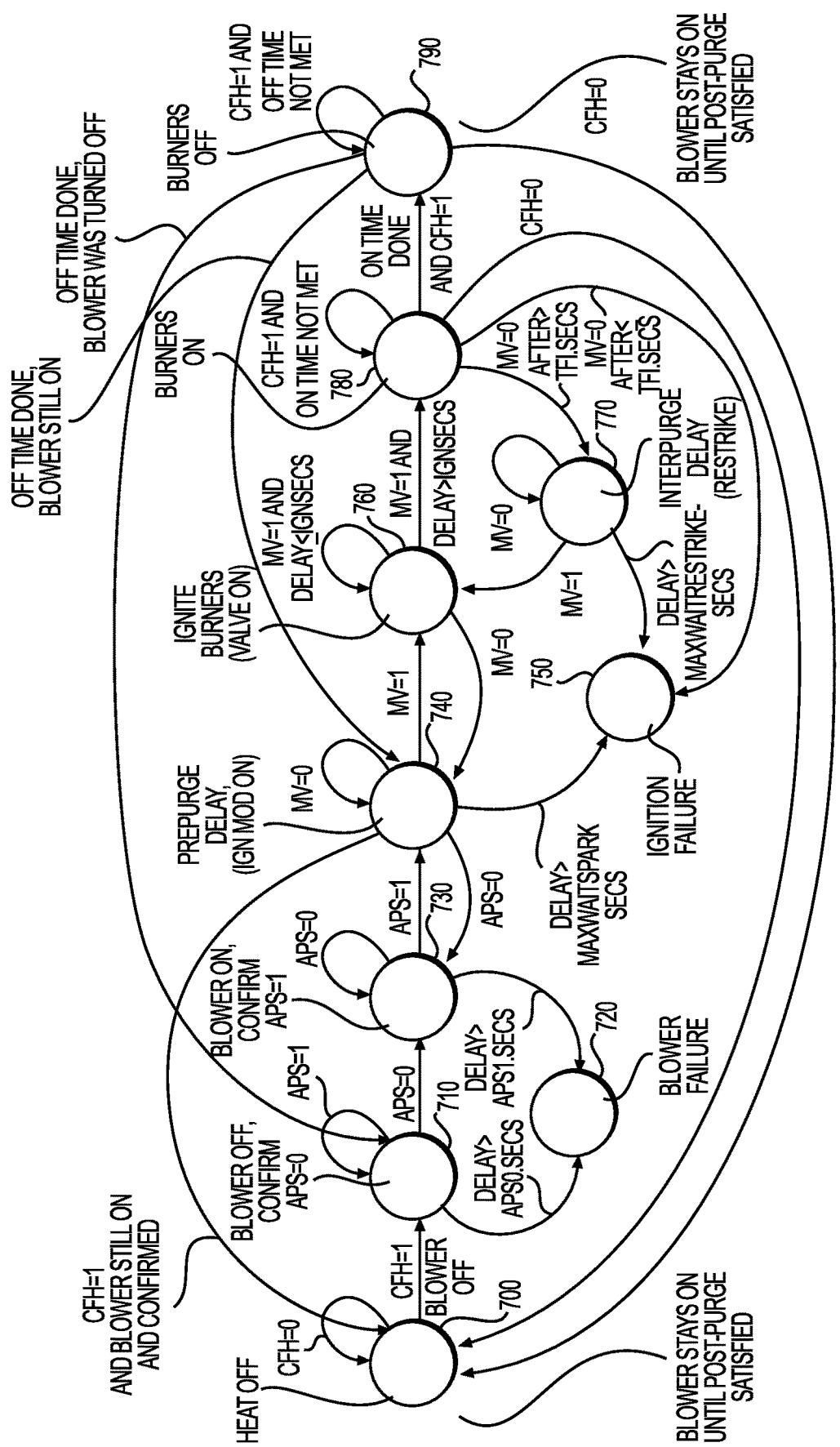
FIGS. 13A and 13B show a component state diagram for a fryer apparatus system, according to a non-limiting embodiment of the present disclosure.
Figure 13B:
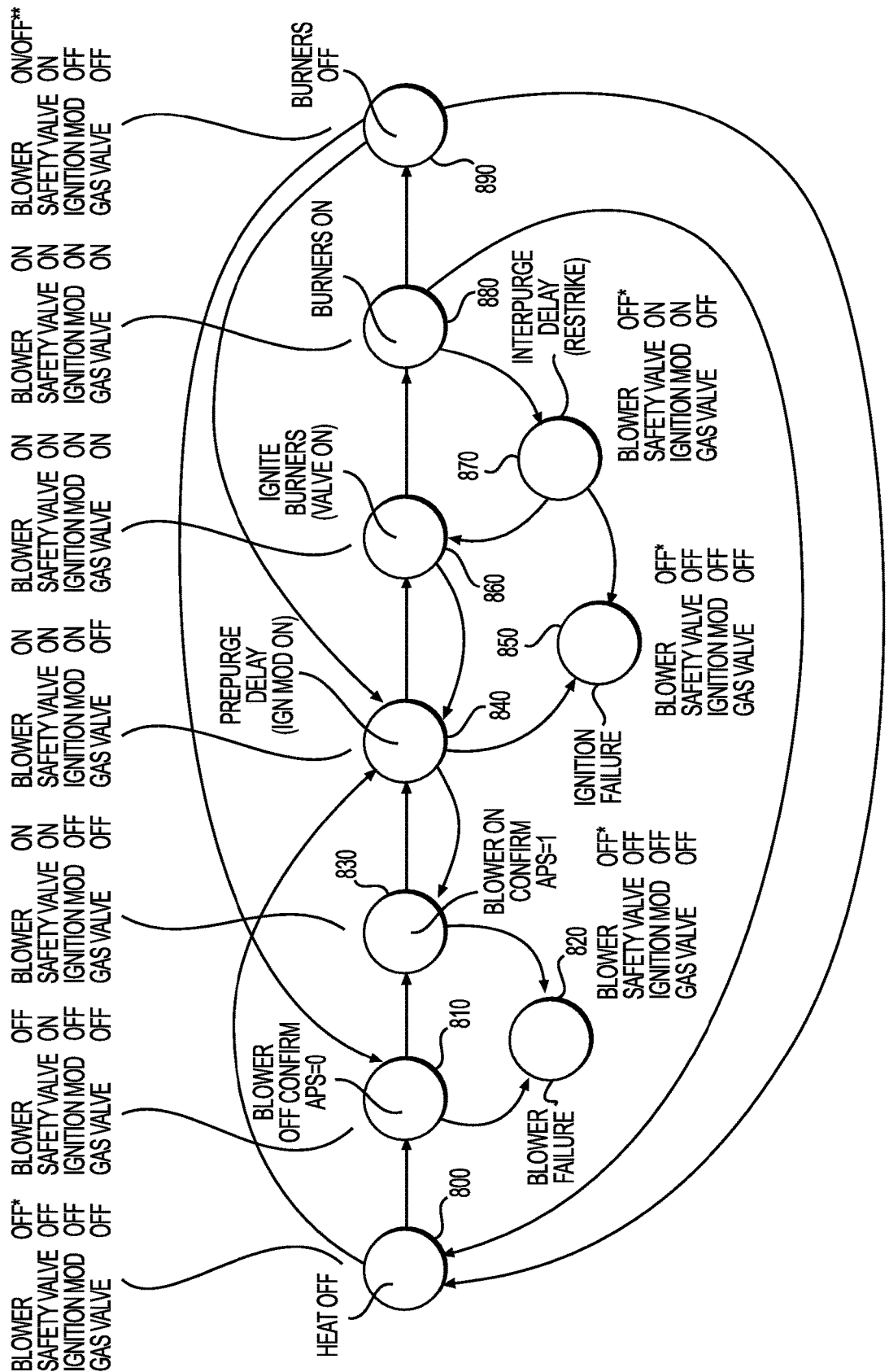

FIGS. 13A and 13B show a component state diagram for a fryer apparatus 102, according to a non-limiting embodiment of the present disclosure. In step 700 of FIG. 13A, the system remains dormant until receiving a call for heat (CFH=0). In addition, the system returns to step 700 after completion of a heating cycle, however the blower 22 may remain activated to complete the post-purge process. Upon receiving a call for heat (CFH=1) at step 710, the fryer control 10 determines that the air pressure switch 24 is open (APS=0). At step 730, the blower 22 is activated and the fryer control 10 waits until the air pressure switch 24 closes (APS=1). As shown in step 720, if there is a delay in determining the status of the air pressure switch 24 either when the blower 22 is off (APSO.secs) or when the blower is on (APS1.secs), the fryer control 10 may return a status indicating failure of the blower 22.

In step 740 of FIG. 13A, the ignition module 32 initiates a pre-purge delay prior to initiating ignition. During the pre-purge delay, the blower 22 may perform a predetermined amount of complete exchanges of air through the system to exhaust combustible gas and create a suitable airflow to support an air-fuel mixture. Ignition module 32 may not be powered unless both blower 22 and air pressure switch 24 are on. During step 740, the gas valve 26 remains off (MV=0). If the time to complete the pre-purge process exceeds a predetermined amount of time (MaxWaitSparkSecs), the fryer control 10 may return a status indicating ignition failure, as shown in step 750.

In step 760 of FIG. 13A, ignition module 32 delays a predetermined amount of time prior to activating gas valve 26 (MV=1) and activating the ignition of burner 132 as shown in step 780. Activation of the gas valve 26 may indicate the pre-purge process is complete. After activation of the gas valve 26, the fryer control 10 may wait a predetermined amount of time (IgnSecs) before transitioning the system to the state of 'burners on,' as indicated in step 780. IgnSecs may be a delay designed to match a typical ignition time of the burners.

At step 780 of FIG. 13A, the burners are considered activated by the fryer control 10. However, ignition module 32 checks the burners to determine whether they are ignited. If no flame is detected within a predetermined amount of time (TFI.Secs), fryer control 10 may initiate an interpurge delay at step 770, during which the gas valve 26 may be reset and the system may reset to the ignition process of step 760. Furthermore, if the ignition module 32 does not resume sparking within a predetermined amount of time (MaxWaitRestrikeSecs), fryer control 10 may indicate ignition failure as shown in step 750. Once the burners are in a state indicated by steps 780 and 790, the cancellation or deactivation of a call for heat may reset the system to step 700, except for the blower 22 which may remain activated to complete the post-purge process.

At step 790 of FIG. 13A, if the 'off' period for the burners is short, the blower 22 may remain on and may continue to initiate the pre-purge process. However, if the 'off' period is significant, the blower 22 may be deactivated after the post-purge process is completed, as shown in step 620. Since the pre-purge process delay may be built into the ignition process of the ignition module 32, the pre-purge time may be built into the 'off' period. For example, if the desired 'off' time is 20 seconds and the pre-purge process requires 5 seconds, the ignition process may begin after 15 seconds off. The blower 22 may then restart for the next heat pulse.

In addition, for example, if a user desires a 15 second pulse of heat, the timing may begin during step 780 of FIG. 13A when burner 132 is activated. Loss of a gas valve signal during step 780 may indicate ignition failure, during which the ignition module 32 may shut down if it fails to sense flame from the burner 132. In step 790, a post-purge process may clear the system after burner 132 has been deactivated. During the post-purge process, blower 22 continues to remain active after burner 132 is shut down in order to create an airflow to send hot exhaust and/or fuel out the outlet flue 110. Similar to the pre-purge process, the post-purge process may complete a predetermined number of cycles of air throughout the system before completion.

FIG. 13B is a diagram of the status of system components during the processes illustrated in FIG. 13A. For steps 800, 820, 850, and 870, the blower 22 is shown as "off*" to account for the post-purge process, wherein the blower 22 may remain active until the post-purge procedure is complete. In step 890, the blower 22 is shown as "on/off*" to illustrate that it may be deactivated after the post-purge process or it may remain activated if the 'off' period is relatively short before reactivating the burners.

The displayed 'safety valve' in FIG. 13B is a back-up gas valve to the gas valve 26. The safety valve may remain active when there is a call for heat. However, the safety valve may be deactivated when a call for heat is cancelled or, for example, if an ignition fault occurs. This redundancy may reduce the number of cycles on the safety valve and improves its longevity and reliability. In addition, the activation schedule of the safety valve may prevent a surge of current from activating both safety and gas valve solenoids at the same time. The ignition module 32 may activate the gas valve 26 after a delay due to the execution of the pre-purge process. As shown in steps 860 and 880, the gas valve 26 may remain on as long as the ignition module 32 is activated, unless the ignition module 32 detects a fault and shuts down the gas valve 26 as shown in step 870.

Figure 14B:
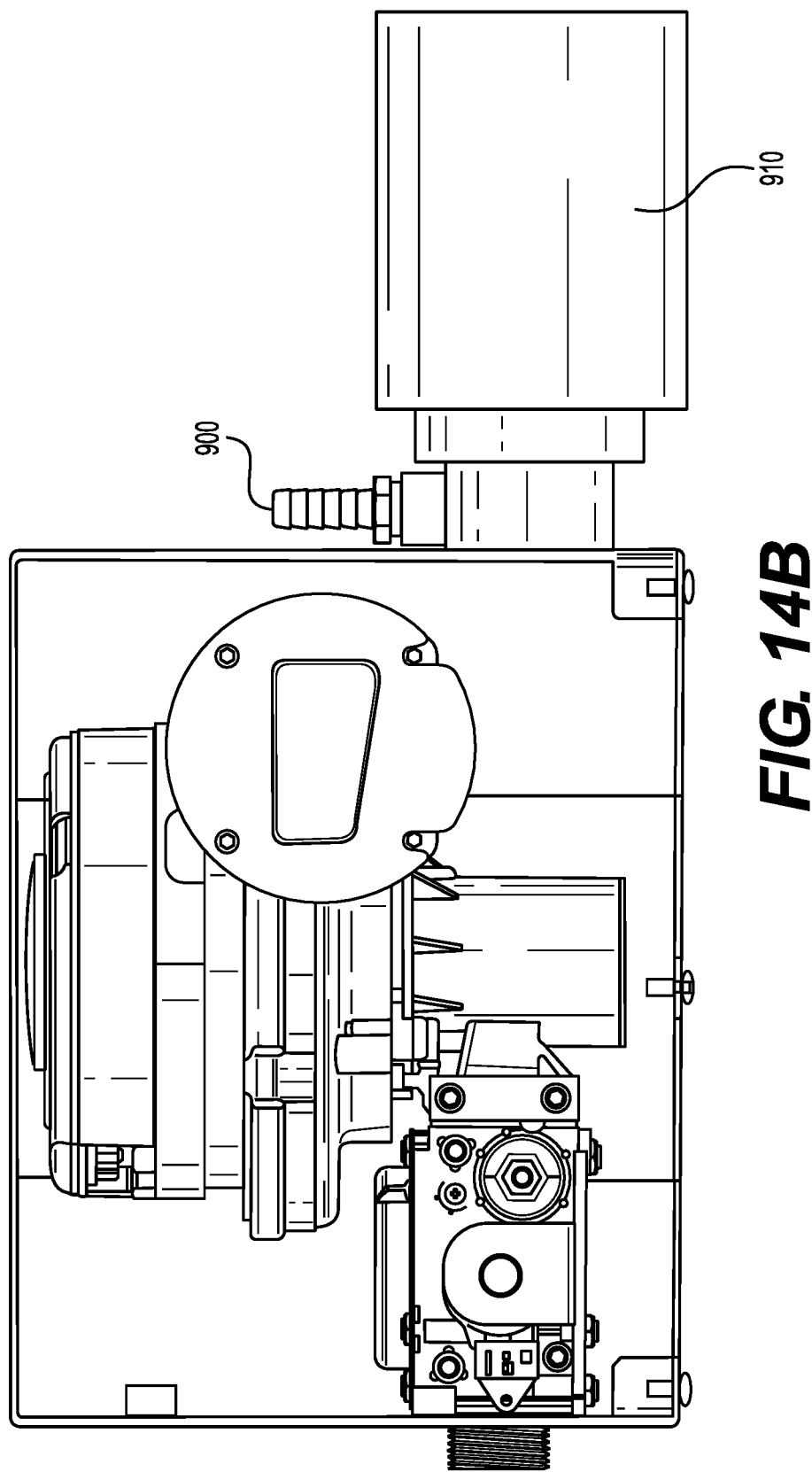

In some non-limiting embodiments of the present disclosure, as shown in FIGS. 14A and 14B, the blower 22 may be encapsulated in an intake housing. A suction filter 910 may be attached to the intake housing. Furthermore, a vacuum switch (not shown) may be attached to port 900, which may be mounted to the suction filter 910. The suction filter 910 may provide air to the intake housing and to the blower 22. The suction filter 910 may screen out oil and other undesirable particles out of the air before reaching the blower 22. In some non-limiting embodiments, the suction filter 910 may be made of spongy material configured to filter out particles of a certain micron size. The blower 22 may function in a more efficient manner with properly filtered air obtained from the suction filter 910. Moreover, the burner 132 may also function more efficiently when provided with filtered air. After significant use, the suction filter 910 may become clogged and require cleaning. The vacuum switch may act as an indicator to signal that the filter needs to be replaced or cleaned, and/or that the fryer apparatus needs to be shut down until the problem is resolved.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A fryer apparatus comprising:
    a cooking chamber configured to hold a cooking medium and configured to receive food product;
    a heater disposed external to the cooking chamber, wherein the heater is configured to heat the cooking medium, the heater including a burner and a heat transfer system configured to disperse heat from the burner along an exterior of the cooking chamber for transfer to the cooking medium;
    a fuel system disposed external to the cooking chamber, wherein the fuel system is configured to deliver an air-fuel mixture to the heater, the fuel system is configured to control the temperature of the heater, and the fuel system is configured to control a temperature of the heater by varying the velocity of an airflow;
    the fuel system further comprising:
        a blower that activates to propel the airflow through a manifold and a distribution conduit to the heater, the blower being operable at varying blower speeds between a minimum rate and a maximum rate, the minimum rate being defined by a lower operation bound of the blower or a lower bound at which combustion in the burner is not reliable; and a fuel injector configured to inject fuel into the airflow to create the air-fuel mixture; and
    a fryer control that operates the heater and the fuel system, the fryer control operating to deliver a requested heating rate in response to a call for heat energy at the cooking chamber, wherein when the requested heating rate is greater than or equal to the minimum rate, the fryer control controls a temperature of the heater by operating the blower continuously and varying the speed of the blower to a value between the minimum rate and the maximum rate to selectively increase burn rate and heat energy generated at the heater based on the amount of air-fuel mixture flow generated by the speed of the blower.

2. The fryer apparatus of claim 1, wherein the burner of the heater comprises a radiant burner.

3. The fryer apparatus of claim 2, wherein the radiant burner further comprises a concave surface facing the cooking chamber.

4. The fryer apparatus of claim 2, wherein the radiant burner is an infrared burner.

5. The fryer apparatus of claim 1, wherein when the requested heating rate is less than the minimum rate, the fryer control controls the temperature of the heater by pulsing the burner through on-and-off cycles, with a duty cycle of pulsing operation and the blower speed being derived from the requested heating rate during the pulsing of the burner.

6. The fryer apparatus of claim 5, wherein the fryer control determines the duty cycle of pulsing operation by an equation of B %×D %=requested heating rate, wherein B % is the blower speed and D % is the duty cycle of pulsing operation.

7. The fryer apparatus of claim 1, wherein the heat transfer system comprises a plurality of baffles configured to disperse heat from a radiant burner among the exterior of the cooking chamber.

8. The fryer apparatus of claim 1, further comprising a lid for the cooking chamber, wherein the lid is configured to enable the cooking chamber to pressure cook the food product.

9. The fryer apparatus of claim 1, further comprising an outlet, the outlet configured to expel gasses downstream from the heater.

10. The fryer apparatus of claim 1, wherein the heater is located on a lateral side of the cooking chamber.

* * * * *